US009364791B1

(12) United States Patent
Fan

(10) Patent No.: US 9,364,791 B1
(45) Date of Patent: Jun. 14, 2016

(54) CARBON DIOXIDE DECOMPOSITION

(71) Applicant: Qinbai Fan, Chicago, IL (US)

(72) Inventor: Qinbai Fan, Chicago, IL (US)

(73) Assignee: Gas Technology Institute, Des Plaines, IL (US)

(*) Notice: Subject to any disclaimer, the term of this patent is extended or adjusted under 35 U.S.C. 154(b) by 0 days.

(21) Appl. No.: 14/620,354

(22) Filed: Feb. 12, 2015

(51) Int. Cl.
*C01B 31/18* (2006.01)
*B01D 53/94* (2006.01)
*B01D 53/86* (2006.01)
*B01D 53/22* (2006.01)

(52) U.S. Cl.
CPC .............. *B01D 53/94* (2013.01); *B01D 53/229* (2013.01); *B01D 53/864* (2013.01); *B01D 53/8671* (2013.01); *B01D 2255/402* (2013.01); *B01D 2257/504* (2013.01)

(58) Field of Classification Search
CPC .... B01D 53/94; B01D 53/229; B01D 53/864; B01D 53/8671; B01D 2255/402; B01D 2257/504
USPC ...................................................... 423/418.2
See application file for complete search history.

(56) References Cited

U.S. PATENT DOCUMENTS

| 8,519,012 B2 * | 8/2013 | O'Connor ................ C10G 1/10 423/418.2 |
| 2012/0228150 A1 | 9/2012 | Kang et al. |
| 2013/0122381 A1 * | 5/2013 | Kang ...................... H01M 8/06 429/408 |

OTHER PUBLICATIONS

Fujiwara, M., et al., "Change of Catalytic Properties of Fe—ZnO/Zeolite Composite Catalyst in the Hydrogenation of Carbon Dioxide", Applied Catalysis A: General, v. 154, Issues 1-2, pp. 87-101, Jun. 12, 1997.
Tamaura, Y. et al., "Complete Reduction of Carbon Dioxide to Carbon Using Cation-Excess Magnetite", Nature, Jul. 19, 1990, v. 346, pp. 255-256.
Kodama, T. et al., "Decomposition of Carbon Dioxide to Carbon Wiht Active Wustite at 300° C.", Comm. of the American Ceramic Soc., 1992, v. 75(5), pp. 1287-1289.
Tabata, M. et al., "$CO_2$ Decomposition With Oxygen-Deficient Mn(II) Ferrite", Jnl of Materials Science, 1993, v. 28, pp. 971-974.
Akanuma, K. et al., "Carbon Dioxide Decomposition Into Carbon With the Rhodium-Bearing Magnetite Activated by H2-Reduction", Jnl of Materials Science, 1993, v. 28, pp. 860-864.
Farghali, A. et al., "Catalytic Decomposition of Carbondioxide Over Freshly Reduced Activated CuFe2O4 Nano-Crystals", Jnl of Materials Process. Techn., 2007, v. 181, pp. 81-87.

(Continued)

*Primary Examiner* — Daniel C McCracken
(74) *Attorney, Agent, or Firm* — Pauley Erickson & Kottis

(57) ABSTRACT

Carbon monoxide and oxygen gas can be produced from carbon dioxide by introducing a supply of $CO_2$-containing gas to a $CO_2$ permeable porous media. The $CO_2$ permeates through the media to separate the $CO_2$ from other species in the $CO_2$-containing gas supply. An oxygen-deficient ferrite material, disposed on a surface of the $CO_2$ permeable porous media, contacts with the separated $CO_2$ at decomposition reaction conditions to produce CO and $O_2$. Corresponding devices for treating exhaust gases from a $CO_2$ exhaust gas-producing apparatus are also provided.

20 Claims, 3 Drawing Sheets

(56) References Cited

OTHER PUBLICATIONS

Cai, W. et al., "Rh Doping Effect on Coking Resistance of Ni/Sba-15 Catalysts in Dry Reforming of Methane", Chinese Chem. Letters, 2014, v. 25, pp. 1411-1415.

Zhang, G. et al., "A Novel Nb2O5-Doped SrCo0.8Fe0.2O3-δ Oxide With High Permeability and Stability for Oxygen Separation", Jnl of Membrane Science, 2012, v. 405-406, pp. 300-309.

Ebner, A. et al., "State-Of-The-Art Adsorption and Membrane Separation Processes for Carbon Dioxide Production from Carbon Dioxide Emitting Industries", Separation Sci. and Techn., 2009, v. 44, pp. 1273-1421.

Du, N. et al., "Advances in High Permeability Polymeric Membrane Materials for $CO_2$ Separations", Energy & Environ. Science, 2012, v. 5, pp. 7306-7322.

Ramasubramanian, K. et al., "$CO_2$ Capture and $H_2$ Purification: Prospects for $CO_2$-Selective Membrane Processes", AIChE Journal, Apr. 2013, v. 59 No. 4, pp. 1033-1045.

Anderson, M. et al., "Inorganic Membranes for Carbon Dioxide and Nitrogen", Rev. Chem. Eng., 2012, v. 28, pp. 101-121.

Chew, T. et al., "Ordered Mesoporous Silica (OMS) as an Adsorbent and Membrane for Separation of Carbon Dioxide ($CO_2$)", Adv. in Colloid and Interface Science, 2010, v. 153, pp. 43-57.

Caro, J. et al., "Zeolite Membranes-Recent Developments and Progress", Microporous and Mesoporous Materials, 2008, v. 115, pp. 215-233.

Chung, S.J. et al., "Dual-Phase Metal-Carbonate Membrane for High-Temperature Carbon Dioxide Separation", Ind. Eng. Chem. Res., 2005, v. 44, pp. 7999-8006.

Janz, G., "Molten Carbonate Electrolytes as Acid-Base Solvent Systems", Symposium on Fused Salts Reactions, Electrochem. Society, Feb. 1967, Toronto Canada, http://www.dtic.mil/dtic/tr/fulltext/u2/651604.pdf.

Salazar, F., "Internal Combustion Engines", Dept of Aerospace and Mech. Engr., Univ of Notre Dame, Apr. 30, 1998, https://www3.nd.edu/~msen/Teaching/DirStudies/Engines.pdf.

Southern California Gas Company, "Reduction of Oxygen (02) in Oven or Furnace Exhaust (Flue) Gases for Industrial Heating Equipment and Boilers", prepared for the California Energy Commission, May 2012, http://www.gosolarcalifornia.ca.gov/tools/newCalcSys/Description/Control%20air-fuel%20ratio.pdf.

Anonymous, "Energy Tips-Process Heating", U.S. Dept. of Energy, Sep. 2005, Process Heating Tip Sheet #3, https://www1.eere.energy.gov/manufacturing/tech_assistance/pdfs/oxygen_enriched_combustion_process_htgts3.pdf.

Anonymous, "Motor Vehicle Exhaust Emissions", Volkswagen AG, Wolfsburg, Germany, Jan. 2000, http://www.volkspage.net/technik/ssp/ssp/SSP_230.pdf.

Park, S-E. et al., "Activation of Carbon Dioxide as an Oxidant Over ZSM-5 Zeolite-Supported Metal Oxide Catalysts", Preprint ACS Fuel Chem. Div., 1996, v. 41(4), pp. 1387-1390.

Anderson, M. et al., "Carbonate-Ceramic Dual-Phase Membrane for Carbon Dioxide Separation", Jnl of Membrane Science, 2010, v. 357, pp. 122-129.

Lin, J. et al., "Dual Phase Membrane for High Temperature $CO_2$ Separation", Technical Progress Rpt (Annual) Sep. 1, 2005-Aug. 30, 2006, Dept of Chem & Mat Engr, Arizona State Univ, Jan. 2007 DE-FB26-00NT41555.

Dortmundt, D. et al., "Recent Developments in $CO_2$ Removal Membrane Technology", UOP LLC, Des Plaines, Illinois, 1999.

Anonymous, "Emission Control Technology for Stationary Internal Combustion Engines, Status Report", Manufacturers of Emission Controls Association, Washington D.C., Jul. 2007.

Lalovic, M. et al., "The Effect of Oxygen Enrichment of Combustion Air on the Amount and Chemical Composition of Combustion Products", Zbornik radova Tehnološkog fakulteta u Leskovcu, ISSN: 0352-6542, Jun. 2011.

\* cited by examiner

CARBON DIOXIDE DECOMPOSITION

BACKGROUND OF THE INVENTION

1. Field of the Invention

This invention relates generally to carbon dioxide decomposition and, more particularly, to carbon dioxide decomposition such as can be applied to carbon dioxide-containing emissions such as from apparatus such as furnaces, engines, boilers and the like.

2. Discussion of Related Art

Many methods have been developed to mitigate $CO_2$ emissions, including chemical, photochemical, and biological methods, for example. Tamaura et al. have reported that that oxygen-deficient $Fe_3O_{4-\delta}$ can decompose $CO_2$ to C with an efficiency of nearly 100% at 290° C. Such report provided a new way to deal with the reduction and utilization of $CO_2$. Subsequently, the binary spinel structure of $MFe_2O_{4-\delta}$ (M=transition metals) had been systematically investigated to decompose $CO_2$ to C at about 300° C. Many papers have studied $CO_2$ decomposition over completely reduced ferrite. The $CO_2$ decomposition reaction involves reduction of ferrite to oxygen-deficient structure by hydrogen and oxidation of the reduced ferrite by $CO_2$. A significant problem with this approach, however, has been that carbon formation blocks continuous $CO_2$ decomposition and the catalyst needs to regenerate by hydrogen to produce oxygen deficient magnetite.

In view of the above, there has been a need and a demand for techniques and associated apparatus or devices for mitigating $CO_2$ emissions that facilitate or otherwise permit continuous or near continuous operation or practice.

SUMMARY OF THE INVENTION

A general object of the invention is to provide transformational methods to mitigate $CO_2$ emissions.

A more specific objective of the invention is to overcome one or more of the problems described above.

One aspect of the invention relates to methods that thermally catalytically decompose carbon to useful CO (such as can be used as or for a fuel) and oxygen.

A method for producing CO and $O_2$ from $CO_2$ in accordance with one embodiment involves introducing a supply of $CO_2$-containing gas to a first surface of a $CO_2$ permeable porous media or layer so that $CO_2$ permeates through the media or layer to separate at least a portion of the $CO_2$ from other species in the $CO_2$-containing gas supply. The separated $CO_2$ contacts an oxygen-deficient ferrite material on a mixed perovskite powder disposed on a second surface, opposite the first surface, of the $CO_2$ permeable porous media or layer at decomposition reaction conditions to produce CO and $O_2$.

In accordance with another aspect of the invention, methods for treating exhaust gases from a $CO_2$ exhaust gas-producing apparatus are provided. In one embodiment, such a method involves introducing the exhaust gases to a $CO_2$ permeable porous media or layer so that $CO_2$ permeates through the media or layer to separate at least a portion of the $CO_2$ from other apparatus-produced exhaust gases. An oxygen-deficient ferrite material disposed on an outer surface of the $CO_2$ permeable porous media or layer is subsequently contacted with the separated $CO_2$ at decomposition reaction conditions to produce CO and $O_2$. The CO and/or the $O_2$, in whole or in part, if desired can be returned to the $CO_2$ exhaust gas-producing apparatus, e.g., a burner, such as to serve to increase fuel combustion efficiency such as via increased oxygen content in the process line.

In another aspect of the invention, a device is provided for treating exhaust gases from a $CO_2$ exhaust gas-producing apparatus. In accordance with one embodiment, such a device includes a $CO_2$ permeable porous media comprising a mixed conducting perovskite catalyst. In accordance one particular embodiment, a suitable $CO_2$ permeable porous media may have or take a planar form. In another embodiment, a suitable $CO_2$ permeable porous media may have or take a tubular form. An oxygen-deficient ferrite material is disposed on outer surface of the $CO_2$ permeable porous media. A catalyst effective to prevent carbon deposition is desirably incorporated in or with the oxygen-deficient ferrite material. The $CO_2$ permeable porous media forms or includes an entrance for introducing the exhaust gases from a $CO_2$ exhaust gas-producing apparatus and an exit for passage of non-$CO_2$ gases.

Other objects and advantages will be apparent to those skilled in the art from the following detailed description taken in conjunction with the appended claims and drawings.

DESCRIPTION OF PREFERRED EMBODIMENTS

As described in greater detail below, the invention advantageously can be used or applied to convert carbon dioxide to useful fuel and oxygen utilizing heat, such as can be provided, result or be a part of exhaust from or by a $CO_2$ exhaust gas-producing apparatus. The $CO_2$ decomposition generates CO and oxygen, which carry waste heat to the combustion chamber for further reaction. Such processing can desirably recover energy from the waste heat and also increase combustion efficiency such as due to or through increases in oxygen concentration.

Moreover, those skilled in the art and guided by the teachings herein provided will understand and appreciate that the invention can be practiced with or in conjunction with various $CO_2$ exhaust gas-producing apparatus such as including but not necessarily limited to combustion engines, solar concentrators, furnaces, boilers, steel refineries, glass smelters, aluminum mills and the like.

In accordance with one preferred aspect of the invention, there is provided a method to decompose carbon dioxide to useful CO fuel and oxygen catalytically at mid-range temperature (i.e., at a temperature below 700° C., preferably at a temperature in a range of 300° C. to 450° C.). Such a method includes or involves:

(1) $CO_2$ separation from exhaust gases;

(2) $CO_2$ dissociation on an oxygen deficient catalyst to CO and oxygen anion ($O^{2-}$) on the oxygen deficient ferrites (ODF); and (3) Oxygen formation via two oxygen anions losing electrons to form oxygen, with return of electrons to the ferrite catalyst:

$$CO_2 + 2M^{2+} \rightarrow CO + O^{2-} + 2M^{3+}$$

$$2O^{2-} + 4M^{3+} \rightarrow O_2 + 4M^{2+}$$

Net reaction: $2CO_2 \rightarrow 2CO + O_2$ where M=Fe, Co, Ni or the like.

A ceramic substrate is desirably incorporated or used to transport $CO_2$ to the ODF catalyst surface and decompose the $CO_2$ to CO and oxygen anion. To prevent or avoid carbon deposition, a suitable catalyst effective to prevent carbon deposition can desirably be incorporated in or with the oxygen-deficient ferrite material. For example, Rh catalyst can be incorporated or used to prevent or avoid carbon deposition. Those skilled in the art and guided by the teachings herein provided will, however, understand and appreciate that other suitable catalyst materials such as known to those skilled in the art can similarly and correspondingly incorporated or used.

A mixed conducting perovskite catalyst can be used as a support for the ODF and Rh to perform a micro-cell redox reaction, in which oxygen anion loses electrons to be oxygen gas and magnetite metal ion gains electrodes. Similar micro-cell redox reactions have previously been known in the field of corrosion protection.

Figure 1:
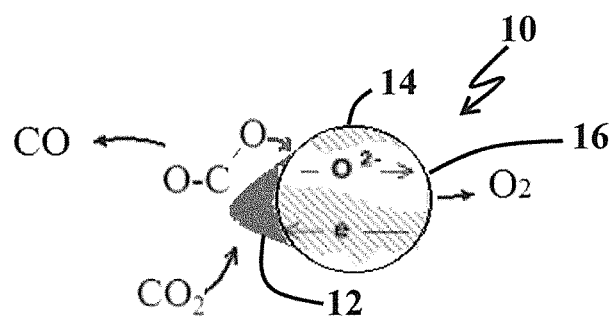
FIG. 1 is a schematic representation of a process for $CO_2$ decomposition on an oxygen deficient ferrites (ODF)/mixed ceramic conductor in accordance with one aspect of the invention.

Turning to FIG. 1 there is shown a schematic representation of a process, generally designated by the reference numeral 10, for $CO_2$ decomposition on an oxygen deficient ferrites (ODF)/mixed ceramic conductor in accordance with one aspect of the invention.

As shown in FIG. 1, $CO_2$ is desirably continuously decomposed by heat. The oxygen deficient ferrite catalyst 12 removes one oxygen from $CO_2$ to form CO gas and an oxygen anion by obtaining two electrons from the catalyst. The oxygen anion transports through the mixed ceramic conductor 14 to the surface 16. Two of the oxygen anions lose electrons to form oxygen gas. The electrons lost by the oxygen anions, in turn, flow back to the catalyst such as to be used again to produce additional oxygen gas. Thus, the overall process reaction is the conversion of $CO_2$ to CO and oxygen by heat. In accordance with one embodiment, the ODF catalyst is desirably deposited on the mixed conductor ceramic support surface such that the two parts are adjacent, adhere or otherwise neighbor each other. The Rh or other carbon deposition preventing or avoiding catalyst material, such as in nanoparticle form, can be disposed on or between the ODF and/or on ceramic particles. Therefore the synergistic reactions of $CO_2$ decomposition and $O_2$ formation can occur simultaneously.

For example, in an embodiment utilizing a ceramic membrane for $CO_2$ transport, the mixed conductor ceramic powder can be inserted or otherwise included in or with the porous layer or media (e.g., tube) to form a $CO_2$ transport membrane and the ODF then deposited on the membrane. In such an embodiment, the ODF and the ceramic powder are also adjacent.

As described in greater detail below, an alternative embodiment to such use of a ceramic mixed conductor powder $CO_2$ transport membrane embodiment is the use of a eutectic carbonate $CO_2$ transport membrane.

Cation excess oxygen deficient ferrites can be made by a mixed ion co-precipitation method to form $MFe_2O_{4-\delta}$ (M=transition metals, $\delta$ is the oxygen deficient number). Those skilled in the art and guided by the teaching herein provided will, however, understand and appreciate that other suitable methods or techniques such as known in the art may be used and that the broader practice of the invention is not necessarily limited by or to specific methods or techniques for preparing or forming oxygen deficient materials.

The mixed conductor ceramic support can be synthesized from commercial available perovskite powders such as $La_{1-x}Sr_xCoO_{1-\delta}$ (LSC) and $SrCo_{0.8}Fe_{0.2}O_{3-\delta}$ (SCF), for example. The mixed ceramic conductor powder can be used as a substrate to deposit the ODF catalysts and, if desired, a suitable catalyst material such as effective to prevent carbon deposition particularly at low temperature. For example, the incorporation or presence of the chemical element rhodium (Rh) such as in a relative amount of 0.5 to 2 composition weight percent can desirably serve to avoid or prevent carbon formation, particularly at temperatures less than 850° C. Those skilled in the art and guided by the teaching herein provided will again, however, understand and appreciate that other suitable catalyst materials effective to prevent carbon deposition can be used and that the broader practice of the invention is not necessarily limited by or to the inclusion of specific or particular catalyst materials to avoid or prevent carbon formation.

Figure 2:
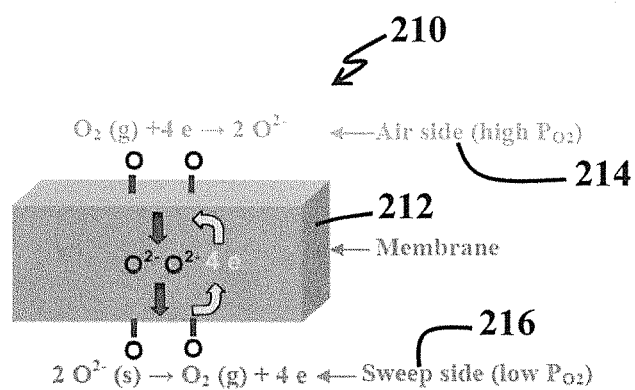
FIG. 2 is a schematic representation of oxygen transport through a dense perovskite membrane in accordance with one aspect of the invention.

Turning to FIG. 2, there is shown a schematic representation of oxygen transport through a dense perovskite membrane in accordance with one aspect of the invention. The overall mechanism, generally designated by the reference numeral 210, shows a membrane 212 having an air side 214, with a relative high $P_{O2}$, and a sweep side 216, with a relative low $P_{O2}$.

Figure 3:
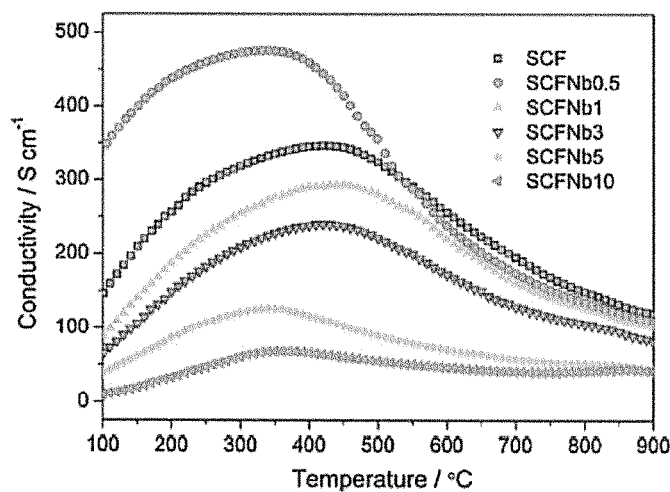
FIG. 3 is a graphical presentation showing the temperature dependence of the total conductivity of $SrCo_{0.8}Fe_{0.2}O_{3-\delta}$ (SCF) and SCFNb in air.

As will be appreciated by those skilled in the art and guided by the teachings herein provided, temperature can be and typically is very important in and oxygen transport. Moreover, the temperature for the $CO_2$ decomposition should preferably be compatible with the mixed conductor for oxygen anion transport/recombination to oxygen. The mixed ceramic conductor substrate should also preferably have good electrical conductivity for both electron and ions transport. FIG. 3 is a graphical presentation showing the temperature dependence of the total conductivity of $SrCo_{0.8}Fe_{0.2}O_{3-\delta}$ (SCF) and SCFNb in air, where the temperature range is from 100 to 600° C.

The exhaust gases provided or resulting from combustion processing typically, in addition to $CO_2$, include various impurities. However, to retain and maintain the catalyst performance and lifetime for the $CO_2$ decomposition reaction/process, such reaction/process desirably employs a sufficiently good quality of $CO_2$, e.g., $CO_2$ without the presence of sufficient impurities from $CO_2$ sources such as may undesirably poison or otherwise harm or disrupt the effectiveness or efficiency of the $CO_2$ decomposition catalyst materials. Common or typical impurities that may be present in exhaust gases provided or resulting from combustion processing may include soot, fine particulates unburned fuel or oil and the like. Thus, in a preferred practice of the invention, a $CO_2$ permeable porous media or layer is used for $CO_2$ transport to the ODF/SCF catalyst surface. $CO_2$ permeable media have been well investigated at elevated temperatures. Membrane separation for $CO_2$ capture has been studied in both pre-combustion gases and post-combustion gases. Most common $CO_2$ separation membrane materials are organic polymers, which typically work best at temperatures below 200° C. Significant efforts have been directed towards the use of inorganic membranes for $CO_2$ separation and some such membranes exhibit high $CO_2$ perm-selectivity and permeance. Unfortunately, at higher temperatures, the $CO_2$ selectivities of these inorganic membranes typically decrease significantly. Since the separation by these microporous inorganic membranes is typically based mainly on the mechanism of preferential adsorption of $CO_2$ on the membrane material, the $CO_2$ selectivities for such membranes commonly diminish at high temperatures (>400° C.). In recent years, however, dense dual phase inorganic membranes that exhibit an infinite selectivity for $CO_2$ over $N_2$ or $H_2$ at temperatures above 500° C. have been developed. These kinds of membranes generally include a porous inorganic phase and a molten carbonate phase. The inorganic phase serves as a porous support and also as an electron and/or oxygen ion conductor. A molten carbonate phase such as of Li/Na/K can be introduced into the porous support. At high temperature, the $CO_2$ can transport through the dual-phase membrane as a carbonate-ion ($CO_3^{2-}$) under the driving force of the $CO_2$ partial pressure gradient. Table 1 lists examples of suitable eutectic carbonates for such duel phase $CO_2$ transport.

TABLE 1

Select eutectic carbonates and their melting temperature

| Eutectic Mixture | Composition (mol %) | | Melting Point (° C.) |
| --- | --- | --- | --- |
| | A | B | |
| $Li_2CO_3$-$K_2CO_3$ | 62 | 38 | 488 |
| $Li_2CO_3$-$K_2CO_3$ | 43 | 57 | 498 |
| $Li_2CO_3$-$Na_2CO_3$-$K_2CO_3$ | 43.5 | 31.5 | 397 |

A suitable support for such eutectic carbonates and ceramic powders can be formed or made of a porous media such of stainless steel, ceramic alumina, carbon fiber composite, glass fiber composite, or the like suitably selected dependent on factors such as mechanical sealing, cost, $CO_2$ transport and the like parameters or requirements.

Figure 4:
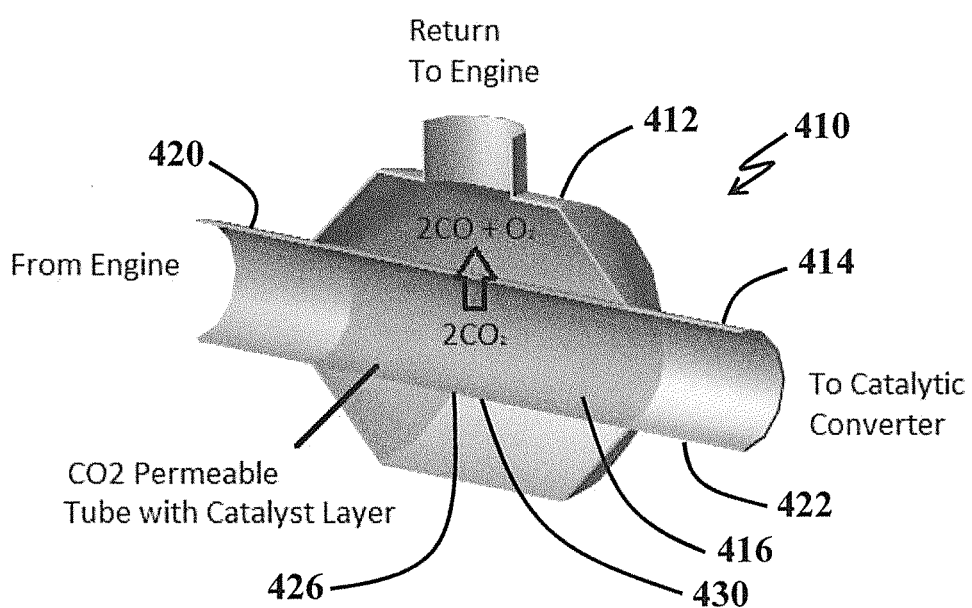
FIG. 4 is a diagram of a $CO_2$ decomposition device in accordance with one aspect of the invention.
Figure 5:
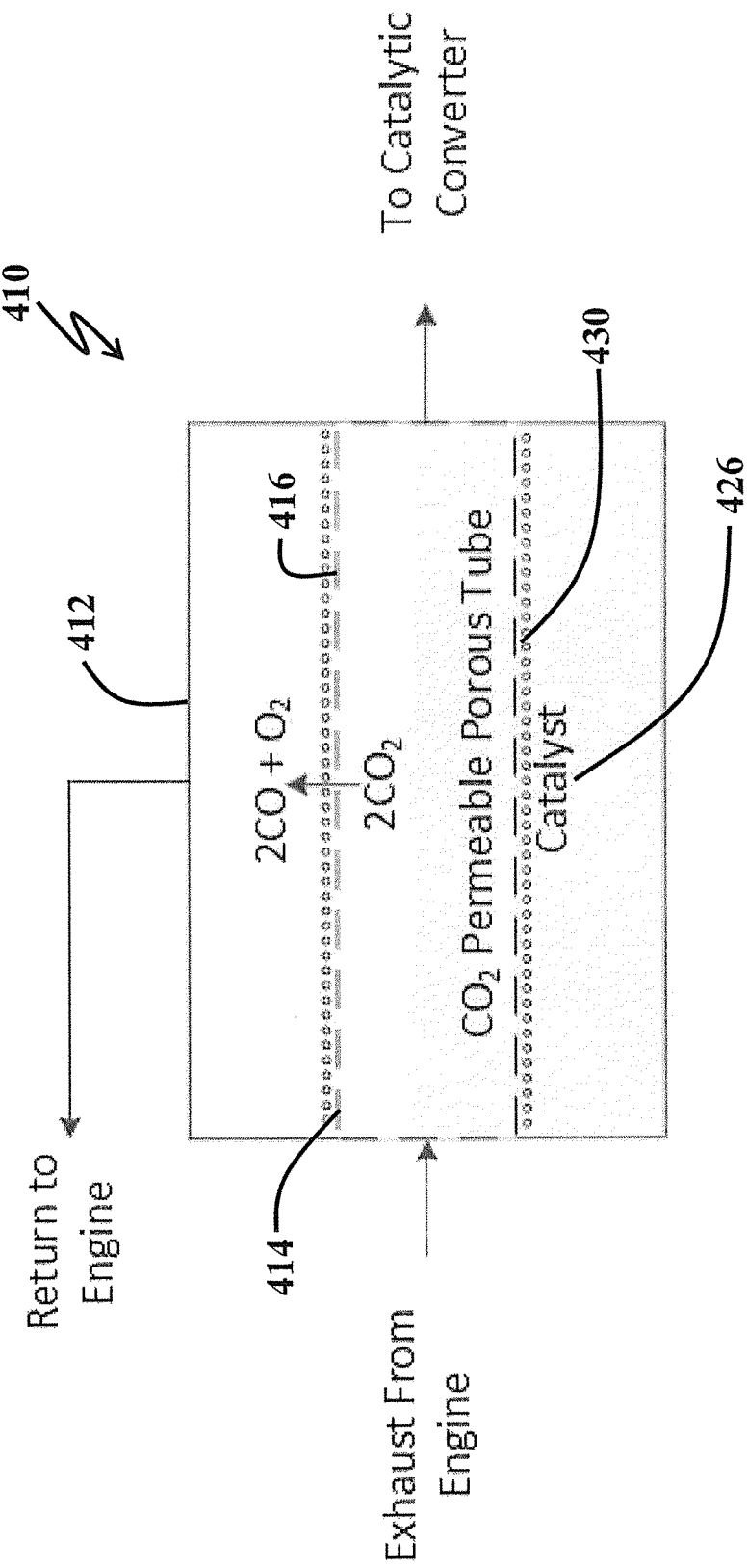
FIG. 5 is a schematic representation of the $CO_2$ decomposition device shown in FIG. 4.

Turning now to FIG. 4 and FIG. 5, FIG. 4 shows a $CO_2$ decomposition device, generally designated by the reference numeral 410, in accordance with one aspect of the invention and FIG. 5 is a schematic representation of the $CO_2$ decomposition device 410 shown in FIG. 4. While FIG. 4 and FIG. 5 depict the $CO_2$ decomposition device 410 in a context of an engine with an associated catalytic converter, those skilled in the art and guided by the teachings herein provided will understand and appreciate that the broader practice of the invention in not necessarily so limited, as the invention can be appropriately applied to other $CO_2$ exhaust gas-producing apparatus, as well.

The device 410 is generally composed of a housing 412 through which a conduit or tube 414 is passed. The conduit or tube 414 includes at least a $CO_2$ permeable porous tube section 416 contained or otherwise appropriately enclosed within the housing 412. The conduit or tube 414 includes or has an entrance 420 to permit the introduction of exhaust gases from a $CO_2$ exhaust gas-producing apparatus. The conduit or tube 414 also includes or has an exit 422 for passage of residual gases including non-$CO_2$ gases from the originally introduced exhaust gas.

At least a portion and, in accordance with one embodiment, all or nearly all of the $CO_2$ permeable porous tube section 416 contained or otherwise appropriately enclosed within the housing 412 has or includes a catalyst material such as in the form of a partial or complete layer or coating 426 disposed on an outer surface 430 thereof. As discussed above, such a catalyst material can desirably be composed of ODF, preferably with or including a suitable catalyst material such as effective to prevent carbon deposition such as Rh on or with a mixed conducting perovskite catalyst. As shown, the decomposition products, e.g., CO and $O_2$, are desirably captured or retained via the housing 412 and can, if desired, be returned to the engine or otherwise appropriately processed.

While concentration differences can generally serve as the principle driving force for the $CO_2$ transport, in practice the flue gas back pressure can also serve as a driving force for the $CO_2$ transport. Furthermore, the eutectic membrane can desirably have a very high $CO_2$ permeability. Moreover, in accordance with one embodiment, as the porous media of the subject device has a thin smooth layer (for example a fine alumina coating layer) on the surface, any particulate fouling effect can and desirably will be reduced. The inclusion and use of eutectic-based membrane can also provide or result in various functional type of advantages including relating to adsorption, reaction, and desorption, for example.

Different combustion processes typically have or exhibit correspondingly different exhaust gas temperatures. For example, a two-stroke engine may typically produce or form an exhaust gas at or with a temperature of approximately 450° C. For a natural gas fired furnace, the flue gas temperature typically changes with the gas composition.

In the practice of the subject technology, temperatures in a range of 200° C. to generally less than 700° C. are generally preferred, as at low temperatures, the time required for $CO_2$ transport through the porous membrane and the $CO_2$ decomposition reaction may be unsuitably prolonged.

An increase of oxygen concentration can desirably serve to increase the combustion efficiency. The air used most commonly in industrial combustion processes as an oxidizing agent, has a high nitrogen content (e.g., 78-79%). In a fuel combustion process, nitrogen generally acts as useless thermal ballast. That is, during air-fuel combustion, the chemically inert nitrogen in the air dilutes the reactive oxygen and carries away some of the energy in the hot combustion exhaust gas. An increase of the oxygen content in the combustion air can act or serve to reduce the energy loss in the exhaust gases and increase the heating system efficiency. For example, previously identified benefits associated with or resulting oxygen-enriched combustion can include:

Increase efficiency. The flue gas heat losses are reduced because the flue gas mass decreases as it leaves the furnace. There is less nitrogen to carry heat from the furnace.

Lower emissions. Certain burners and oxy-fuel fired systems can achieve lower levels of nitrogen oxide, carbon monoxide, and hydrocarbons.

Improve temperature stability and heat transfer. Increasing the oxygen content allows more stable combustion and higher combustion temperatures that can lead to improved or better heat transfer.

Increase productivity. When a furnace has been converted to be oxygen-enriched, throughput can be increased for the same fuel input because of higher flame temperature, increased heat transfer to the load, and/or reduced flue gas.

Thus, the invention desirably provides techniques or methods and associated apparatus or devices for mitigating $CO_2$ emissions that facilitate or otherwise permit continuous or near continuous operation or practice.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for producing CO and $O_2$ from $CO_2$, said method comprising:
   introducing a supply of $CO_2$-containing gas to a first surface of a $CO_2$ permeable porous media so that $CO_2$ permeates through the media to separate at least a portion of the $CO_2$ from other species in the $CO_2$-containing gas supply;
   contacting the separated $CO_2$ at decomposition reaction conditions with an oxygen-deficient ferrite material on a mixed perovskite powder disposed on a second surface of the $CO_2$ permeable porous media to produce CO and $O_2$.

2. The method of claim 1 wherein said $CO_2$ permeable porous media comprises a membrane of ceramic, eutectic carbonate or both.

3. The method of claim 1 wherein the permeable porous media comprises a mixed conducting perovskite catalyst.

4. The method of claim 3 wherein the mixed conducting perovskite catalyst comprises a Group VIII metal selected from the group consisting of Fe, Co and Ni.

5. The method of claim 1 wherein the $CO_2$ permeable porous media comprises an outer surface whereon the oxygen-deficient ferrite material is disposed.

6. The method of claim 5 wherein a catalyst effective to prevent carbon deposition is incorporated with the oxygen-deficient ferrite material.

7. The method of claim 6 wherein the catalyst effective to prevent carbon deposition comprises Rh.

8. The method of claim 7 wherein a mixed conducting perovskite catalyst forms a support for both the oxygen-deficient ferrite material and Rh as well as to catalyze micro-cell redox reaction whereby $O^{2-}$ react to form $O_2$.

9. The method of claim 1 wherein the decomposition reaction conditions include operation at a temperature of less than 700° C.

10. The method of claim 9 wherein the decomposition reaction conditions include operation at a temperature in a range of 300° C. to 450° C.

11. The method of claim 1 wherein the supply of $CO_2$-containing gas introduced into the $CO_2$ permeable porous media comprises a portion of a quantity of apparatus-produced exhaust gases introduced to the $CO_2$ permeable porous media.

12. The method of claim 11 wherein the exhaust gases are produced by an apparatus selected from the group consisting of a furnace, an engine and a boiler.

13. A method for treating elevated temperature exhaust gases from a $CO_2$ exhaust gas-producing apparatus, said method comprising:
   introducing the elevated temperature exhaust gases to a $CO_2$ permeable porous media so that $CO_2$ permeates through the media to separate at least a portion of the $CO_2$ from other apparatus-produced exhaust gases;
   contacting an oxygen-deficient ferrite material disposed on an outer surface of the $CO_2$ permeable porous media with the separated $CO_2$ at decomposition reaction conditions to produce CO and $O_2$.

14. The method of claim 13 wherein said contacting of the oxygen-deficient ferrite material disposed on the outer surface of the $CO_2$ permeable porous media with the separated $CO_2$ at decomposition reaction conditions to produce CO and $O_2$ comprises:
   first contacting the oxygen-deficient ferrite material disposed on the surface of the $CO_2$ permeable porous media with the separated $CO_2$ to produce CO and $O^{2-}$ and
   second contacting a micro-cell redox reaction catalyst with the $O^{2-}$ at redox reaction conditions to produce $O_2$.

15. The method of claim 13 wherein the $CO_2$ permeable porous media comprises a mixed conducting perovskite catalyst comprising a metal selected from the group consisting of Fe, Co and Ni and wherein a catalyst effective to prevent carbon deposition is incorporated with the oxygen-deficient ferrite material.

16. The method of claim 15 wherein a mixed conducting perovskite catalyst forms a support for both the oxygen-deficient ferrite material and the catalyst effective to prevent carbon deposition as well as to catalyze micro-cell redox reaction whereby $O^{2-}$ react to form $O_2$.

17. The method of claim 13 wherein the decomposition reaction conditions include operation at a temperature of less than 700° C.

18. The method of claim 17 wherein the decomposition reaction conditions include operation at a temperature in a range of 300° C. to 450° C.

19. The method of claim 13 wherein the $CO_2$ exhaust gas-producing apparatus is selected from the group consisting of a furnace, an engine and a boiler.

20. A device for treating exhaust gases from a $CO_2$ exhaust gas-producing apparatus, said device comprising:
   a $CO_2$ permeable porous media comprising a mixed conducting perovskite catalyst, the $CO_2$ permeable porous media having an outer surface whereon the oxygen-deficient ferrite material is disposed and incorporates a catalyst effective to prevent carbon deposition,
   the $CO_2$ permeable porous media having an entrance for introducing the exhaust gases from a $CO_2$ exhaust gas-producing apparatus and an exit for passage of non-$CO_2$ gases.

* * * * *